United States Patent [19]

Westhoff

[11] Patent Number: 5,645,504

[45] Date of Patent: Jul. 8, 1997

[54] POWER TRANSMISSION BELT WITH TEETH REINFORCED WITH A FABRIC MATERIAL

[75] Inventor: William L. Westhoff, Denver, Colo.

[73] Assignee: The Gates Corporation, Denver, Colo.

[21] Appl. No.: 536,292

[22] Filed: Sep. 29, 1995

[51] Int. Cl.⁶ .............................. F16G 1/28; F16G 1/04; F16G 5/00

[52] U.S. Cl. .......................... 474/250; 474/260; 474/265; 474/267; 474/271; D5/7

[58] Field of Search .................................. 474/266, 267, 474/268, 269, 270, 271, 143; D5/3, 7, 19; 66/9 A; 156/137, 139; 138/123, 124, 137; 428/250, 253, 254

[56] References Cited

U.S. PATENT DOCUMENTS

| | | |
|---|---|---|
| 1,828,136 | 10/1931 | Freedlander . |
| 3,078,206 | 2/1963 | Skura . |
| 3,853,017 | 12/1974 | White, Jr. et al. ............ 474/271 |
| 4,015,038 | 3/1977 | Romanski et al. ............ 474/270 |
| 4,305,714 | 12/1981 | Renshaw . |
| 4,332,576 | 6/1982 | Stecklein . |
| 4,518,375 | 5/1985 | Mashimo et al. . |
| 5,171,190 | 12/1992 | Fujiwara et al. ............ 474/266 |
| 5,362,281 | 11/1994 | Dutton et al. . |
| 5,427,728 | 6/1995 | Beck et al. . |
| 5,529,545 | 6/1996 | Isshiki et al. ............ 474/268 |

FOREIGN PATENT DOCUMENTS

| | | | |
|---|---|---|---|
| 0036626 | 3/1980 | Japan ............ | 474/266 |
| 165136 | 11/1933 | Switzerland ............ | 66/9 A |

*Primary Examiner*—Tamara L. Graysay
*Assistant Examiner*—Gary S. Hartmann
*Attorney, Agent, or Firm*—H. W. Oberg; C. H. Castleman, Jr.

[57] ABSTRACT

A power transmission belt with a body of belt material and belt teeth formed of the body and covered with a knitted fabric with a 1×1 rib construction.

11 Claims, 2 Drawing Sheets

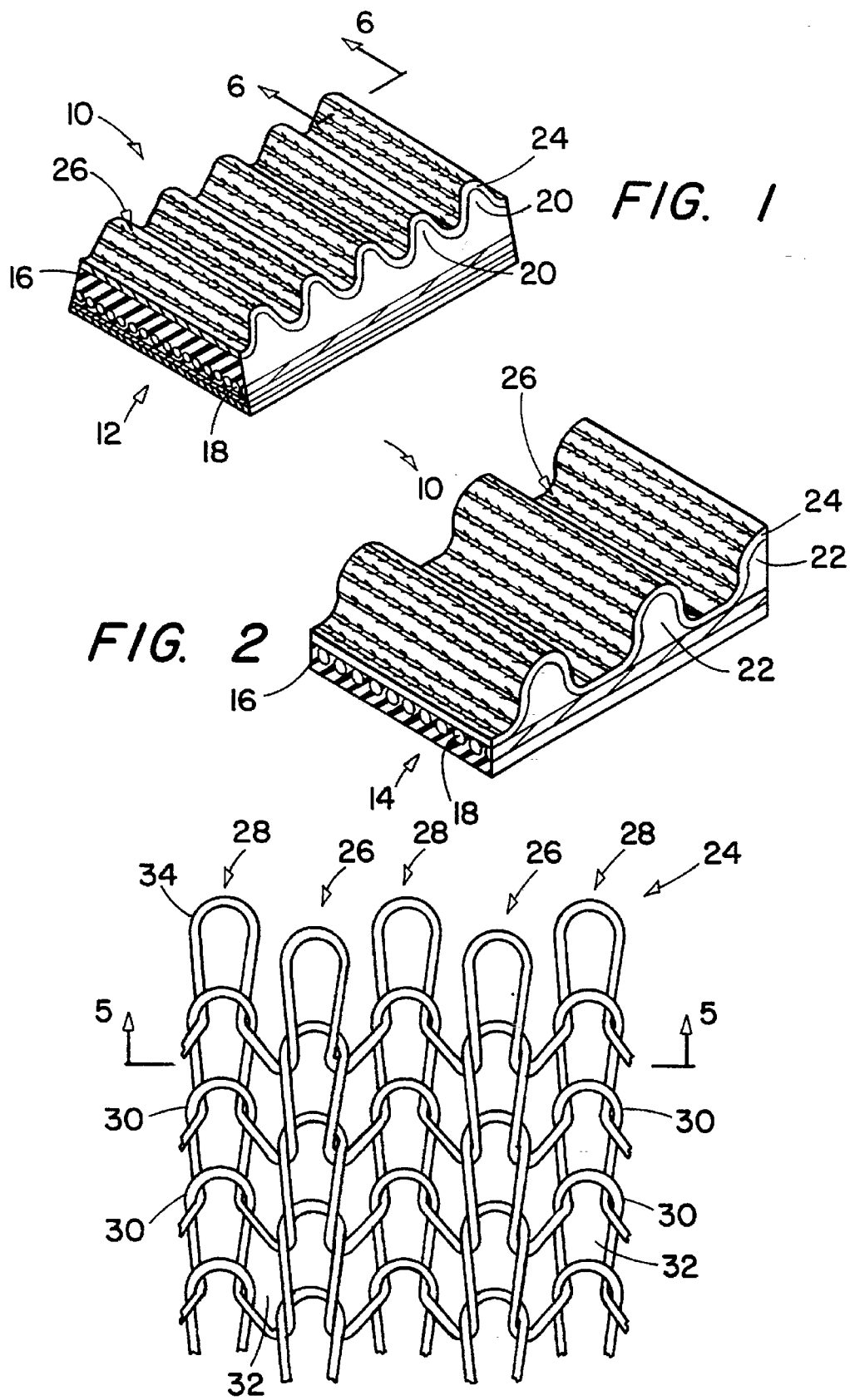

POWER TRANSMISSION BELT WITH TEETH REINFORCED WITH A FABRIC MATERIAL

BACKGROUND OF THE INVENTION

The invention relates to a toothed power transmission belt, but more particularly, the invention relates to a belt with a fabric material as a reinforcement for teeth associated with the belt.

Many power transmission belts have a body of belt material with a plurality of teeth formed of the body along at least one surface of the belt. Such belts may have a tensile member embedded in the body as a load carrying member, and a wear resistant fabric material as a reinforcement at the periphery of the belt surface that includes the belt teeth. The power transmission belt may be in the form of a V-belt such as a variable speed belt where the teeth are in the form of cogs that define belt grooves for enhancing belt flexibility. Another type of toothed belt is a synchronous or timing belt where the belt teeth are designed to engage a toothed pulley to effect power transmission. The fabric material reinforces the teeth for each of these types of belt and provides a wear resistant surface.

A known power transmission belt uses belt teeth in a dual capacity which is to transmit power with a toothed pulley, and to provide belt grooves for enhanced belt flexibility for bending around a small diameter V-pulley. U.S. Pat. No. 1,828,136 discloses a toothed power transmission belt having a V-cross section where the V-sides of the belt engage a small diameter V-pulley and the teeth of the belt engage a large diameter toothed pulley. The belt teeth are covered with a layer of fabric material.

U.S. Pat. No. 4,305,714 discloses a cut-edge, variable speed belt with a plurality of teeth formed along its inside surface which are covered with a fabric material. The teeth define a plurality of grooves which enhance flexibility.

It is known to use a stretchable fabric material when forming teeth in a belt. U.S. Pat. No. 3,078,206 discloses the use of stretchable fabric material in the manufacture of a toothed power transmission belt. A belt sleeve with the stretchable fabric is placed over a toothed mold member and the outside surface of the belt sleeve is pressed with a mold member which displaces belt material and stretches the fabric forcing it into the mold while forming belt teeth. The belt teeth are left with a covering of fabric material.

Early fabrics used for reinforcing belt teeth were in the form of a square woven cotton material. In some cases the cotton was cut on the bias to provide some degree of extensibility. Special fabric materials with a high degree of longitudinal flexibility were developed for toothed belts to enable the belt tooth to be easily formed in the molding process in a manner such as that for U.S. Pat. No. 3,078,206. One form of such fabric is a square woven crimped nylon fabric which has a high degree of stretch. Another example of a specially developed fabric is disclosed in U.S. Pat. No. 4,518,375.

Warp knit fabrics have been used in the manufacture of V-belts to cover teeth. The fabrics while providing some support, have low adherence with belt teeth. An example of a knitted nylon fabric that is used to cover teeth of small size synchronous power transmission belts is disclosed in U.S. Pat. No. 5,427,728.

There is a trend to use square woven, crimped nylon fabric material that was developed for synchronous belts in heavy duty variable speed belts. Such stretchable nylon fabrics reinforce the belt teeth and provide requisite transverse rigidity to inhibit the variable speed belt from turning over when subjected to the transients of a pulley shifting between high and low speeds. The advantage of the stretchable nylon fabric is that it need not be preformed in the belt manufacturing process to form belt teeth. A problem with such nylon fabrics is its inherent instability at temperatures above 340° F. or less if water is present. The nylon fabric melts at approximately 489° F. which may leave residue on the variable speed pulley components when the melted nylon refreezes. Nylon will decompose if water is present. Such high temperatures may be reached when the bottom surface of a variable speed belt slips against a shaft of a variable speed pulley that doubles as a clutch. While square woven fabrics of higher temperature resistant materials could be used in variable speed belts, they typically require the extra processing steps preforming the fabric as part of the belt manufacturing process.

While warp knit nylon fabric is used in V-belts and light duty synchronous belts, it has not found widespread use in V-belts because the warp knit fabric does not have a high adherence to the surfaces of molded belt teeth and the fabric does not have a structure which contributes to transverse reinforcement of a power transmission belt.

SUMMARY OF THE INVENTION

In accordance with the invention, a power transmission belt with molded teeth is provided and is of the type with a body of belt material and a tensile member embedded in the body. The teeth are covered with a fabric material disposed at a peripheral surface of the belt that includes the teeth. The fabric is a weft knit yarn structure in the form of a 1×1 rib where ribs of one side of the fabric are embedded in the belt material and ribs on the outside of the belt teeth are at least partially exposed at surfaces of the belt teeth.

An object of the invention is to provide a knitted fabric material suitable for reinforcing teeth of a V-belt and preferably a variable speed belt; and a synchronous belt.

Another object of the invention is to provide an economical fabric that provides belt teeth with a wear resistant fabric while also imparting transverse rigidity thereto.

Another object of the invention is to provide a belt with belt teeth reinforced with a fabric material made of a heat resistant yarn suitable for use with clutching pulleys of a variable speed belt drive.

These and other objects and advantages of the invention will be apparent after reviewing the drawings and detailed description thereof wherein:

FIG. 1 is a fragmentary perspective view of a portion of a variable speed drive belt embodying the invention;

FIG. 2 is a view similar to FIG. 1 but showing a synchronous belt embodying the invention;

FIG. 3 is a fragmentary schematic plan view of fabric material showing a weft knitted yarn structure in the form of a 1×1 rib;

DESCRIPTION OF PREFERRED EMBODIMENT

Figure 4:
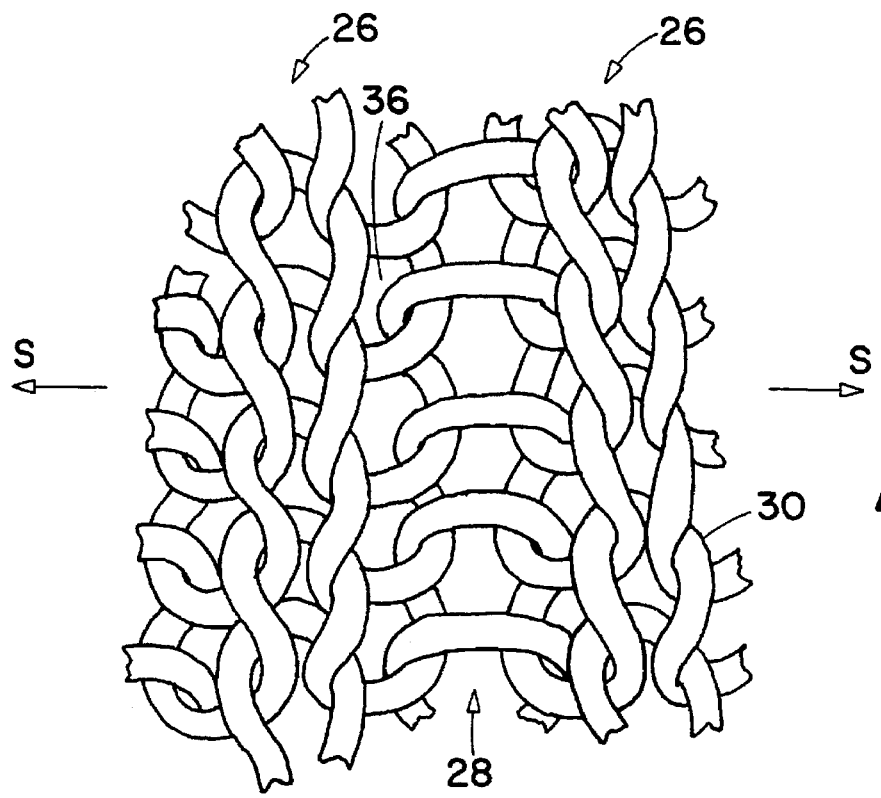
FIG. 4 is a view similar to that of FIG. 3 but showing an enlarged view of actual 1×1 rib fabric material that has been stretched in a direction lateral of the ribs.

Referring to FIGS. 1 and 2, power transmission belts of the invention are shown. The belt of FIG. 1 is in the form of a cut-edge variable speed belt 12, and the belt of FIG. 2 is in the form of a synchronous or timing belt 14. Each belt has a body 16 of belt material, a tensile member 18 of a cord material embedded in the body, and a plurality of spaced teeth 20, 22, formed of the body along at least one surface of the belt. The teeth are reinforced with a fabric material 24.

The body may be of any desired material, which include, by way of example, natural rubbers, synthetic rubbers and blends thereof; urethane such as of the milleable gum variety and thermo plastics such as polyester. The embedded tensile member is preferably of the endless type such as a spirally wound cord and is made from a material that displays minimum elongation under load such as fiberglass and aramid. The profile of the belt teeth 20, 22, may be of any desired configuration. In the case of a variable speed belt 12, the teeth are shaped as cogs to provide flexibility, and the spacing between the teeth in the form of grooves, may be varied to minimize noise. In the case of a synchronous belt 14, the belt teeth 22 are designed for power transmission and may be of any desired shape such as trapezoidal, or curvilinear.

The belt teeth are formed of the body by known methods. For example, the belt teeth of a variable speed belt 12 may be formed by pressing a mold matrix into the surface of the belt or in the case of the synchronous belt, the belt teeth may be formed by a material transferring process where belt material is forced by a mold member into a mold cavity defining belt teeth. In either case, the fabric covering the belt teeth is stretched and positioned during the tooth forming process.

Figure 5:
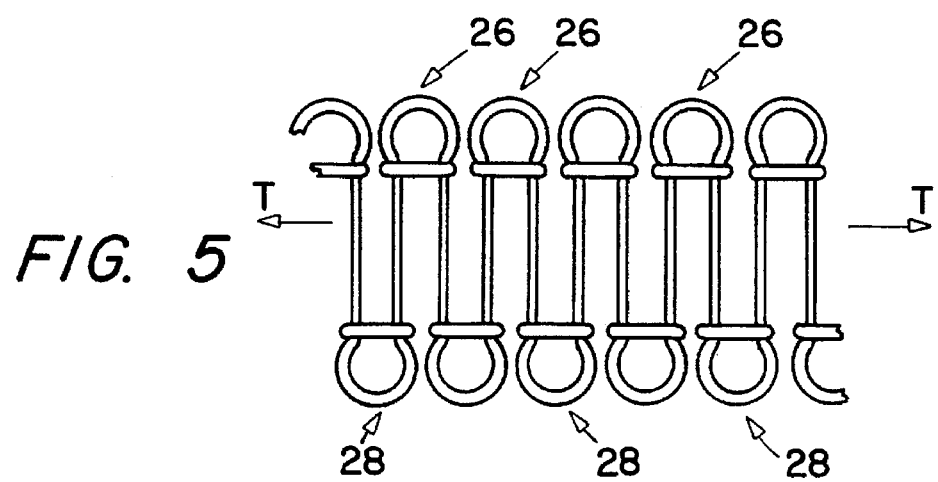
FIG. 5 is a view taken along the line 5—5 of FIG. 3 showing a schematic representation of 1×1 rib fabric that has not been stretched.

Referring to FIGS. 3 and 4, the fabric material is a weft knitted structure in the form of a 1×1 rib. The so knitted fabric material has laterally offset ribs 26, 28 on each of the fabric's surfaces. Each rib is formed by interconnecting yarn loops 30. As shown in FIG. 3, ribs 26 are formed on the side of the fabric facing the viewer while ribs 28 are formed on the opposite side of the fabric. As shown by the schematic representation in FIG. 5, the 1×1 rib structure is a generally pleated structure that allows the fabric to be stretched in an accordion fashion in a direction T—T transverse to the ribs. The knitted fabric structure forms a plurality of interstices between the loops of yarn 34. The interstices or loops of yarn enlarge 36 as the fabric is stretched in a direction S—S transverse to the ribs as shown in FIG. 4.

The yarn from which the knitted fabric is formed may be of any fiber suitable for knitting such as cotton, cotton-nylon blend, nylon, aramid, aramid-rayon blend, acrylic, acrylic-rayon blend, polyester, polyester-cotton blend and rayon. It is preferable that one of the fibers forming the yarn has thermal stability up to at least 500° F. such as aramid, cotton, rayon, and acrylic. The advantage of such materials is that they do not melt and refreeze on component parts such as a clutching, variable speed pulley. Fibers such as aramid do not melt but rather, decompose at about 700° F.

Weft knitted fabric material in the form of a 1×1 rib may be stretched in a direction with the ribs or transverse to the ribs. It is preferred that the fabric material be stretched from about 15 to about 200 percent in a direction lateral of the ribs when making a belt. When the fabric is stretched, interstices between successive ribs or the loops enlarge 36. The fabric is stretched S—S in a direction lateral of the ribs when constructing a power transmission belt. A flat knitted material may be sewn together into a cylindrical tube having a desired circumference, or a tube of material may be directly knitted. The so formed tubular fabric material is stretched and circumferentially expanded when fabricating a power transmission belt sleeve. In the case of a synchronous belt, the fabric material is placed over the exterior of the belt sleeve and a mold matrix is pressed in known fashion into the belt sleeve forming teeth. In the case of a synchronous belt, the tube of knitted fabric may be stretched and placed over a toothed mold whereafter a belt sleeve placed over the fabric may be pressed into the mold forming belt teeth. In either method, the knitted fabric material is left at the exterior surface of the belt teeth.

Preferably, the ribs 26 of the fabric are oriented so that they extend transversely of the belt and across the teeth as shown in FIGS. 1 and 2. It is important that the fabric be sufficiently stretched to obtain a requisite adhesion with the belt material. To illustrate the effect of fabric stretch on adhesion with belt material samples one inch wide were tested with fabric treated with an RFL adhesive and stretched at different percentages. Unstretched fabric (0 percent) adhered during the curing of belt material exhibited an adhesion of 20 lbs. Fabric that was stretched 50% had an adhesion of 25 lbs. and fabric stretched 100% had an adhesion of 36 lbs.

Figure 6:
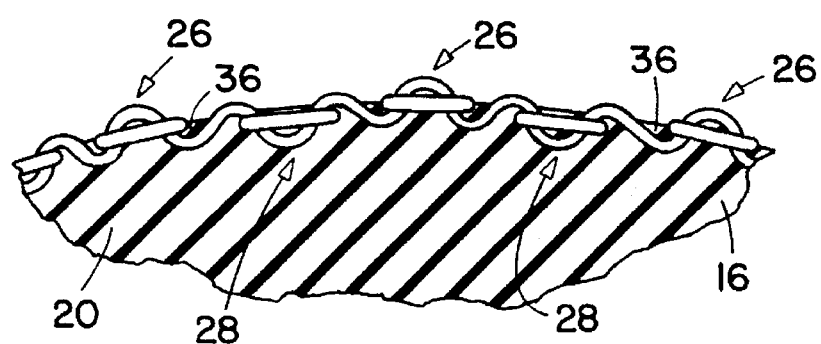
FIG. 6 is an enlarged fragmentary cross-sectional view taken along the line 6—6 of FIG. 1 and schematically showing how fabric is embedded in a belt body to reinforce belt teeth.

Referring to FIG. 6, the knitted fabric is pressed into the outer surface of the belt including the belt teeth during the molding process. The ribs 28 on the inside of the fabric facing the belt teeth are embedded in the body 16. The ribs 26 at the outer surface of the fabric and belt teeth are at least partially exposed at the belt tooth surface. Also, the interstices 36 of the fabric between the ribs are at least partially filled with belt material. It is believed that the ribs 28 that are embedded in the knitted fabric material and filled with body material act as a structural member to transversely reinforce the belt teeth 20, 22 because the interstices of the so embedded rib are filled with belt material which locks the fabric together. The rib 28 of fabric material embedded in the body material forms an excellent mechanical bond with the belt material making it difficult to pull the fabric material from the belt teeth. This adhesion is far superior to that of warp knitted fabric that may be easily pulled from the belt teeth because there are no ribs to interlock with the fabric material forming the belt teeth.

To illustrate the effectiveness of the invention, three variable speed belts were constructed with teeth molded of belt material along the inside surface of the belt. The first belt had no reinforcement covering the belt teeth. The second belt was constructed with a nylon crimp fabric (210 denier, 12.59 oz/yd$^2$) of the type used in synchronous or timing belts. The third belt was made in accordance with the invention and was constructed with a fabric material of a 1×1 rib knit (265 denier, 3.7 oz/yd$^2$) of an aramid NOMEX—rayon blend yarn. The belts were operated between variable speed pulleys in a dynamic test to assess the shifting attributes of the belt which can be measured in the number of cycles the belt can be shifted before belt turnover. The belt with no fabric reinforcement on its teeth operated three, cycles. The belt using crimped nylon fabric covering its teeth operated 400 cycles. The belt using the 1×1 rib fabric covering the belt teeth operated 330 cycles.

As the testing indicates, the belt of the invention is substantially equivalent to the belt using conventional crimped nylon as a belt tooth reinforcement material. However, in the belt of the invention the fabric was made with a much lighter (3.7 oz/yd$^2$) aramid-rayon blend yarn having a high temperature capability up to 700° F. (oxidation temperature) whereas the much heavier fabric (12.5 oz/yd$^2$)

of crimped nylon had a temperature capability of 489° F. (melt point). An advantage of the belt of the invention is that the fabric was constructed with a yarn of rayon-aramid blend which had a thermally stable temperature above 500° F. The belt of the invention is capable of operating in variable speed drives on a clutching pulley without melting whereas belts using the prior art nylon fabric are unsuitable because the fabric melted on the pulley clutching mechanism.

The foregoing detailed description is made for purpose of illustration only and is not intended to limit the scope of the invention which is to be determined from the appended claims.

What is claimed is:

1. A power transmission belt of the type with a body of belt material, a tensile member embedded in the body, and a plurality of belt teeth formed of the body and reinforced with a cloth fabric material and wherein the improvement comprises:

the fabric material being a weft knitted structure in the form of a 1×1 rib with a plurality of ribs formed at opposite sides of the fabric and laterally offset from each other, the knitted structure stretched in a direction lateral of the ribs and in a manner that enlarges interstices between successive ribs, the ribs of an inside surface of the fabric material embedded in the body and the interstices at least partially filled with belt material leaving ribs of an outside of fabric material at least partially exposed at surfaces of the belt teeth.

2. The power transmission belt as claimed in claim 1 wherein the fabric is stretched from about 15 to about 200 percent.

3. The power transmission belt of claim 1 wherein the ribs are oriented generally transversely of the belt.

4. The power transmission belt as claimed in claim 1 wherein the teeth are power transmission teeth of a synchronous belt.

5. The power transmission belt as claimed in claim 1 wherein the teeth are in the form of cogs of a cut-edge V-belt.

6. The power transmission belt of claim 1 wherein the fabric is of a material selected from the group consisting of rayon-aramid blend, acrylic, aramid, nylon, cotton, and cotton-polyester blend.

7. The power transmission belt of claim 1 wherein the fabric material includes a fiber material thermally stable up to at least 500° F.

8. A V-belt of the cut-edge type with a body of belt material, a tensile member embedded in the body, a plurality of belt teeth formed of the body forming grooves in the body, the teeth and grooves reinforced with a fabric material and wherein the improvement comprises:

the fabric material being a weft knitted yarn structure in the form of a 1×1 rib with a plurality of ribs formed of interconnected yarn loops on each side of the fabric where the ribs of one side are laterally offset from the ribs of the other side in generally a pleated fashion, the knitted structure stretched at least 15 percent in generally an accordion fashion spreading the pleats in a direction transverse to the ribs and opening yarn loops interconnecting the ribs and wherein the ribs of one side are embedded in the belt material and the loops interconnecting the ribs are filled with belt material leaving ribs at an outside of the teeth at least partially exposed.

9. The V-belt as claimed in claim 8 wherein the fabric is stretched from about 15 to about 200 percent.

10. The V-belt as claimed in claim 8 wherein the yarn is of a material selected from the group consisting of cotton, cotton-nylon blend, nylon, nylon- rayon blend, aramid, aramid-rayon blend, acrylic, acrylic-rayon blend, polyester, cotton-polyester blend, rayon, cotton-rayon blend.

11. The V-belt as claimed in claim 8 wherein the yarn includes a material that is thermally stable up to a temperature of 500° F.

* * * * *